March 20, 1928. H. MacMILLAN Re. 16,913
LAVATORY FIXTURE
Original Filed Oct. 13, 1922
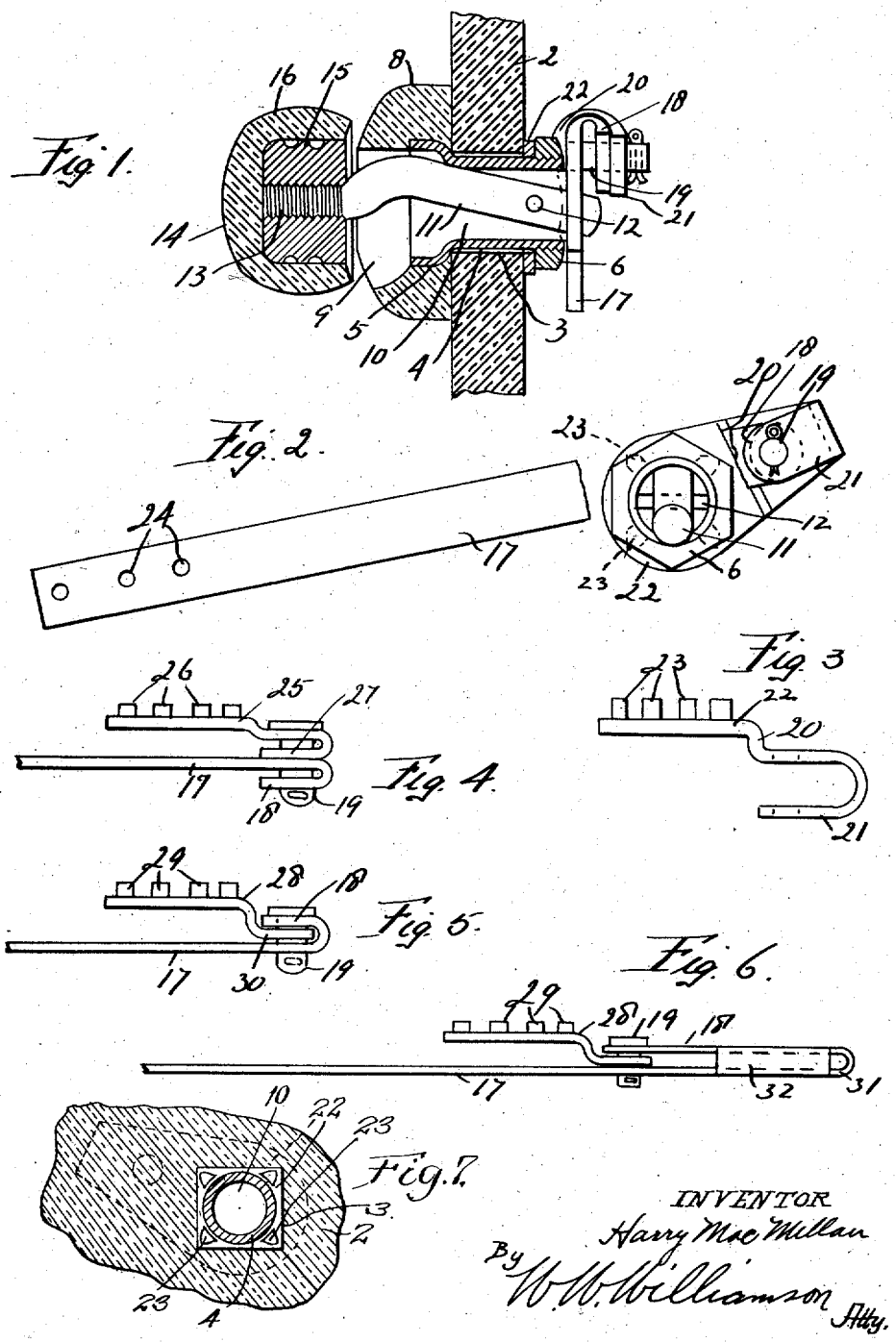
INVENTOR
Harry MacMillan
By W. W. Williamson Atty.

Reissued Mar. 20, 1928. Re. 16,913

UNITED STATES PATENT OFFICE.

HARRY MacMILLAN, OF PHILADELPHIA, PENNSYLVANIA, ASSIGNOR TO NATIONAL METAL PRODUCTS COMPANY, OF PHILADELPHIA, PENNSYLVANIA, A COMMON-LAW TRUST.

LAVATORY FIXTURE.

Original No. 1,591,429, dated July 6, 1926, Serial No. 594,368, filed October 13, 1922. Application for reissue filed July 26, 1927. Serial No. 208,613.

My invention relates to new and useful improvements in a lavatory fixture, and more particularly to a flush tank operating lever for use in actuating the ball controlling outlet from a tank having for its primary object to provide an operating lever projecting through the wall of a tank fulcrumed at a suitable point intermediate its length and adapted to actuate the flush or ball lever by a slight pressure upon the outer end of the operating lever.

Other objects of the invention are to fulcrum the operating levers that they may move vertically, horizontally, diagonally, in the arc of a circle or universally.

Further objects of my invention are to provide nipples with a straight bore either round, oval or other suitable shape in cross section flared in one or two directions or produced of two castings suitably connected as by screws.

Still further objects of this invention are to fulcrum the operating levers by means of a pin passing through it, under it, over it, on one or both sides, by means of a ring within the nipple either separate from or attached to the operating lever or by fulcruming said lever upon a portion of the nipple at either end or at any point intermediate its ends.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a vertical sectional view of a flush tank operating lever embodying my invention and showing it applied to the front wall of a flush tank.

Fig. 2, is a rear end view thereof removed from the tank with a portion of the ball lever broken away.

Fig. 3, is an edge view of the fulcrum plate, bracket or hanger for the ball lever.

Fig. 4, is a similar view of a slight modification showing the ball lever attached.

Fig. 5, is a similar view of a further modification.

Fig. 6, is another similar view of a further modified form.

Fig. 7, is a fragmentary sectional view of the tank wall intermediate its front and rear faces looking rearwardly to show the position of the lugs on the fulcrum bracket relative to the nipple.

In carrying out my invention as embodied in Figs. 1 and 2, the reference numeral 2 represents the wall of a flush tank having a hole 3 therethrough for the insertion of a nipple 4, the forward or outer end of which is expanded or enlarged to form a flange 5 for engagement with the outer face of the tank wall. The rear or inner end of this nipple is externally threaded to receive the nut 6 for fastening the nipple in place.

On the forward or outer end of the nipple is mounted an escutcheon 8 when desired and this escutcheon may be of porcelain or other suitable material having an opening 9 communicating with the bore 10 of the nipple and in this bore is fulcrumed the operating lever 11 as by a pin 12 passing through the operating lever with its ends set in the walls of the nipple.

As here shown this operating lever is formed from a metal bar of circular cross section having its outer end 13 offset from the main body portion of the lever and projecting obliquely to the axis of the main body portion, said outer end being threaded for connection with the push button or knob 14, here shown as comprising a metal core 15 surrounded by a jacket 16 of suitable material, such as porcelain for instance. Such a construction provides for producing the major portion of the push button or knob of heavy relatively inexpensive metal or material and covering or facing this core with a higher grade of different material or metal which may possibly be lighter in weight and in some cases it is desired that the outer end of the operating lever be weighted to act as a counterbalance for the ball or flush lever and its component parts to the end that less pressure or force will be required for actuating the device. In this particular form of the invention the operating lever is fulcrumed adjacent the inner end of the nipple with the inner or rear end of said lever underlying and contacting with the lower edge of the ball or flush lever 17 intermediate its ends. The fixed or pivoted end of the ball lever 17 has a turn over portion 18 spaced from and parallel with the main portion of said lever to provide an extended bearing surface for the ball lever on the pin 19 which acts as its fulcrum or pivot, the ends of said pin being set in the fulcrum plate, bracket or hanger 20, the bent over extension 21 spaced from and parallel with said bracket or hanger the said extension with a portion of the bracket or hanger also forming a housing for the pivoted end of the ball lever 17. The fulcrum plate, bracket or hanger has a hub 22 which is disposed between the nut 6 and the inner face of the flush tank wall. As the bracket or hanger 20 must be held in an angular position or in such a position that the pivot point of the ball lever above and to one side of the inner coacting end of the operating lever and since the holes in tanks of this character are generally rectangular or some non-circular in shape, I provide a number of positioning or locking lugs 23 on the bracket or hanger and more particularly the hub thereof will occupy portions of the hole in the tank wall through which the nipple passes but not filled by said nipple, as for instance the corners of a square hole and these locking lugs engage the tank wall surrounding the hole will prevent movement of the bracket or hanger.

From the foregoing description it will be seen that the nipple with or without an escutcheon and having an operating lever fulcrumed therein may be readily inserted in the hole through the tank wall and then the bracket or hanger with the ball lever attached properly positioned and all of the parts secured in place by the screwing of the nut 6 on the inner projecting end of the nipple. Where the outer end of the operating lever is weighted as here shown the ball lever with its component parts will be counterbalanced by said weighted operating lever so that the only force or pressure necessary to actuate the operating lever will be that which will overcome the pressure of the water in the tank upon the ball controlling the outlet from said tank, it being understood that such a ball although not shown is connected by its stem with the ball lever the upper end of said stem being inserted in one of the holes 24 at the outer or free end of the ball lever.

In Fig. 4, I have shown a bracket or hanger 25 having locking lugs 26 for use in the same manner as those designated by the numeral 23 and provided with a turned over extension 27 parallel with a portion of the bracket lying close to said portion so as to provide an extended bearing for the pivot pin 19 on which is fulcrumed the ball lever 17 having the turned over portion or extension 18 formed with the main body portion of the said lever and extended bearing on the pin 19 outside or beyond the turned over extension of the bracket or hanger.

In Fig. 5 is shown a similar bracket 28 having locking lugs 29 arranged in the same manner as above set forth but this bracket or hanger has a single tongue 30 on one side of which is positioned the main body portion of the ball lever 17 while its turned over portion or extension 18 is positioned on the opposite side of the tongue 30 and through these parts is inserted the pivot pin 19. This illustrates a slightly different mode of producing an extended bearing for the pivot pin and the ball lever only.

Approximately the same arrangement shown in Fig. 5 is illustrated in Fig. 6 with the exception that the loop formed by the turned over portion or extension 18 of the ball lever 17 is extended to provide an overhanging projection 31 for carrying a suitable weight 32 to overbalance the long free end of the operating lever and its component parts for the same purpose as when the outer end of the operating lever is weighted or to assist the weighted operating lever in counterbalancing the other elements.

Of course I do not wish to be limited to the exact details of construction as herein shown as these may be varied within the limits of the appended claims without departing from the spirit of my invention.

Having thus fully described my invention, what I claim to be new and useful is:—

1. In a device of the character stated, a fulcrum bracket consisting of a hub having locking lugs thereon, an arm and a turned back portion, said last named portion and the arm having aligned holes therethrough for the reception of means to support a ball lever.

2. In a device of the character stated, a ball lever having a turned back portion, said turned back portion having a hole in its extreme free end in alignment with a hole in the body of the lever, and a weight mounted within the loop formed by the turned back portion.

3. In combination with a flush tank having a hole in one of the walls thereof, a nipple passing through the hole in said tank wall, means at one end of said nipple to engage one face of the tank wall, a fulcrum plate on the inner end of said nipple, lugs carried by said plate and projecting into the hole in the tank wall about the nipple to prevent torsional movement of said plate, means mounted on the inner end of the nipple and engaging the plate to hold the parts in place, a lever journalled on the plate, and a push lever of considerably less diameter than the bore of the nipple and adapted to engage the first named lever, and a pin passing through the walls of the nipple and the push lever to fulcrum the latter within said nipple.

4. The combination with a tank having a hole in one of its walls, of a nipple having at least one cross sectional dimension substantially filling said hole, a fulcrum plate mounted on said nipple and provided with lugs occupying the spaces within the hole unoccupied by the nipple and means on the nipple to hold said nipple and the plate in place on the tank wall.

5. The combination with a tank having a hole in one of its walls, of a nipple in said hole and provided with a flange to secure said nipple against the outer wall of the tank, an escutcheon engaging said flange, an operating lever pivoted within the nipple and extending thru the escutcheon, and a handle on the outer end of the operating lever and covering the hole in said nipple and escutcheon.

6. In a flushing device, a nipple; a lever; a pivot supporting said lever for vertical movement within said nipple; bearing means associated with said nipple; a ball lever journalled on said bearing means and arranged at right angles to said first mentioned lever and coacting therewith, whereby movement of the outer end of said first mentioned lever will actuate the ball lever.

7. In a flush tank operating mechanism a lever passing through a tank wall and pivoted upon a pin; a second lever within the tank and at right angles with the first mentioned lever and means to fulcrum the second lever for coaction with the first lever.

8. In a closet flushing mechanism, a lever passing through an aperture in a tank wall, a pin supported by the apertured wall, upon which pin the lever is pivoted, and a fulcrumed member within the tank for actuation by the lever.

9. In a closet flushing mechanism, a lever passing through an aperture in a tank wall and pivoted upon a pin secured to the apertured wall, a fulcrumed member to actuate an outlet valve, said fulcrumed member mounted for direct coaction with the lever.

10. In a closet flushing mechanism, a member secured to an apertured tank wall, a lever passing through the aperture in the tank wall and pivoted upon a pin attached to the member, and a fulcrumed member within the tank to coact with the lever.

11. In a closet flushing mechanism a fulcrumed member within a tank, and a lever fulcrumed upon a pin secured to an apertured wall, and passing through the tank wall, to actuate the member.

12. In a closet flushing mechanism, a member carrying a pivot pin and secured to an apertured tank wall, a lever passing through the hole in the tank wall and pivoted upon a pin secured adjacent the member and a second member pivoted upon the first mentioned pivot pin, said second member coacting with the lever.

13. In a closet flushing mechanism, a fulcrumed member within a tank to actuate an outlet valve and a lever fulcrumed at a fixed point intermediate its ends, and passing through the tank wall, to actuate the fulcrumbed member.

14. A mechanism for operating a flush tank discharge valve comprising, in combination, means supported on a tank wall to fulcrum a lever at a fixed point intermediate its ends, said lever, and a member fulcrumed in the tank and supporting the discharge valve and coacting with the lever, to be actuated thereby.

In testimony whereof, I have hereunto affixed my signature.

HARRY MacMILLAN.